United States Patent
Schultz

[11] 3,987,240
[45] Oct. 19, 1976

[54] DIRECT CURRENT POWER SYSTEM INCLUDING STANDBY FOR COMMUNITY ANTENNA TELEVISION NETWORKS

[75] Inventor: Robert T. Schultz, Glendora, Calif.

[73] Assignee: Glentronics/Division of Sawyer Industries, Inc., Glendora, Calif.

[22] Filed: June 26, 1974

[21] Appl. No.: 483,208

[52] U.S. Cl. .............. 178/6; 178/DIG. 13; 178/DIG. 11; 325/308; 178/6.8
[51] Int. Cl.² .......................... H04M 7/10
[58] Field of Search ............. 178/6, 6.8, DIG. 11, 178/DIG. 23, 5.6, DIG. 13; 179/170 J, 170 R; 325/185, 186, 308; 320/25, 26, 119; 317/31, 33 VR, 7, 8, 46; 307/66

[56] References Cited
UNITED STATES PATENTS

| | | | |
|---|---|---|---|
| 2,820,157 | 1/1958 | Reike | 317/8 |
| 2,820,181 | 1/1958 | Bowman et al. | 317/8 |
| 3,512,044 | 5/1970 | Jones | 317/33 VR |
| 3,699,250 | 10/1972 | Bunting | 325/308 |
| 3,740,738 | 6/1973 | Kosanovich | 317/31 |

*Primary Examiner*—Benedict V. Safourek
*Assistant Examiner*—Edward L. Coles
*Attorney, Agent, or Firm*—Nilsson, Robbins, Dalgarn & Berliner

[57] ABSTRACT

A direct current power supply system for providing power, including standby, to coaxial cable amplifiers in community antenna television networks. Alternating current is rectified and used to power coaxial cable amplifiers spaced along the cable and to maintain a full charge on a storage battery which is continually connected to the input of the cable. In the event of failure of the commercial primary power source, the battery feeds power to the cable amplifiers. Provision may be made for selectively reversing the output of the power supply to insure that there will be no corrosion deposits caused by electrolysis. Finally, the invention also provides circuitry for protecting the storage battery from excessive discharge during power failures of long duration.

9 Claims, 4 Drawing Figures

DIRECT CURRENT POWER SYSTEM INCLUDING STANDBY FOR COMMUNITY ANTENNA TELEVISION NETWORKS

FIELD OF THE INVENTION

This invention relates generally to amplifier systems for community antenna television networks, or CATV. More particularly, the invention disclosed herein involves a system and circuitry for supplying electrical power to CATV coaxial amplifiers and provides further for continuous supply of power to the amplifiers in the event of failure of the primary power source.

Broadly, in the practice of this invention, power for the operation of amplifiers spaced throughout a CATV network is delivered in direct current form over the coaxial cables. The cables, then, carry both the television signals which are enhanced by the amplifiers and the electrical power to operate the amplifiers.

It may sometimes occur that the primary source of electrical power, generating equipment operated by a utility, or other causes such as a downed power pole, will cause a local power failure. Generally, such failure will not stop transmission of signals by a television station since most stations maintain their own auxilliary power equipment. However, in the case of transmission of television signals by coaxial cable in a CATV network, loss of a primary source of power to cable amplifiers would result in attenuation of signals by the cable to a level resulting in most users of the network being unable to receive a usable image.

Accordingly, this invention provides a power system which may also be utilized in the event of failure of the primary source of power. The standby part of the system, which includes a storage battery, is maintained at full charge by current drawn from the primary power source during normal operation of the coaxial amplifier power supplies. Following failure of the primary source, the standby system delivers power immediately.

Also, provision is made by this invention for protection of the power supply, including the standby system, from harmful conditions, such as line surges or lightning and discharge of the storage battery beyond a safe level.

DESCRIPTION OF THE PRIOR ART

Community antenna television, or CATV, is a system in which television signals are carried to viewers by coaxial cable rather than over the air. Typically, at the present, CATV networks are employed in areas where terrain prevents reception of clear signals by air, where improved reception is required, where stations are too distant for air transmission or where "pay-TV" programming and/or two-way transmission is desired.

In most systems, special antennas pick up television signals and deliver them to the "headend" of the CATV network, where they are processed for transmission by cable. Headend processing includes amplification, filtering out unwanted signals and translation of UHF frequencies to frequencies of unused VHF channels. All received channels are then transmitted to individual viewers by coaxial cable.

Transmission of television signals by coaxial cable, while introducing little distortion, results in substantial attenuation of the transmitted signal. For example, in transmission of VHF channel 13 frequencies over three-quarter inch coaxial cable results in a 10 percent power loss for every 100 feet of cable. Accordingly, at the end of 1,000 feet of cable, channel 13 frequencies would have a signal strength only about ten percent that of the original signal; at the end of 2,000 feet, signal strength drops to about 1 percent. Obviously, if the signals are not re-amplified, they would soon disappear.

To provide the needed signal enhancement, amplifiers are spaced along the coaxial cable throughout the CATV network. While the exact number and spacing of amplifiers is determined by cable size, number of viewers, and so forth, amplifiers are typically placed every one-fourth to one-third mile of cable.

Originally, CATV cable amplifiers utilized vacuum tubes. Such amplifiers required such large amounts of power that each amplifier power supply was connected directly to a utility power line. Under such conditions, it was virtually impossible to provide each amplifier with a standby power source in the event of failure of the primary source because of the amount of power required.

When transistors operable at video frequencies became available, however, the power requirements of coaxial amplifiers lessened considerably. Also, it was found that power could be transmitted to each amplifier over the same coaxial cable that carried the television signals. In such systems, sixty cycle AC power is fed onto the coaxial cable and mixed with the video signal. Each amplifier is provided with an individual power supply which takes the power frequency cable which is then rectified, filtered and regulated and fed to the connected amplifier.

In such a system, of course, failure of the primary power source effectively shuts down the CATV network since power is removed from the coaxial amplifiers. This is unacceptable from two standpoints. First, coaxial networks may be utilized for the transmission of video frequency data or alarm signals in addition to the usual consumer video programs. In such cases, a power outtage of even several seconds in duration would cause data or alarm signals to be lost. Secondly, the government now requires a standby power system for the coaxial amplifiers in certain locations in the event there is loss of the primary commercial power source.

All present CATV standby systems operate on the same general principal. Since AC power is used to power the amplifiers via the CATV cable, the standby units must also provide AC power. Accordingly, a standby unit is provided with a rectifier unit which maintains a storage battery in a charged condition and an inverter for converting the battery DC output to AC power for supplying the cable. Additionally, many standby units also include a logic circuit for detecting power failure and switching the battery-feed inverter to the cable. Thereafter, upon sensing the next availability of commercial power, the logic circuitry switches the inverter off.

Many disadvantages are found in the existing AC standby power units. First, they are extremely expensive. Each standby power unit must include a rectifier, battery, regulator, inverter and, in many cases, the logic circuitry for turning the standby unit on and off. Secondly, because of the circuit complexity, maintenance and replacement costs are high. Thirdly, also because of the circuit complexity, reliability is not high. The latter disadvantage is particularly significant in CATV systems which transmit data or alarm signals.

In general, the above disadvantages follow from the universal use of AC power to operate CATV coaxial amplifiers. AC power has always been so used, not because of any advantages which would follow, but because of a very widespread belief that, because of electrolysis problems, DC power cannot be used.

SUMMARY OF THE INVENTION

In accordance with this invention, provision is made for the supply of DC power to CATV networks for powering CATV coaxial cable amplifiers. AC commercial power is rectified and fed to the coaxial cable for normal amplifier powering. At the same time, the rectified current is used to maintain a full charge on a storage battery which is kept continually connected to the coaxial circuit. To cancel any electrolysis effects which might otherwise occur, provision may be made for reversing the output polarity of the power supply from time to time. Also, a sensing circuit protects the storage battery from excessive discharge by removing it from the system if its terminal voltage falls below a predetermined level.

DC powering of CATV cable amplifiers obtains many advantages over the prior AC power supplies described above. First, because the inverter is deleted, and the logic circuitry reduced or eliminated, a substantial savings in cost is realized. It has been found that initial capital expenditures for the DC power supply made in accordance with this invention is about half that of existing AC coaxial standby power supply units.

Secondly, because the power supply made in accordance with this invention is much less complex than existing AC supplies, maintenance and replacement costs are much less.

Thirdly, again because of the greatly reduced complexity, the reliability of a power supply made according to this invention is more than double that of existing AC systems.

Fourth, when this invention is used, there is no transfer time duration between loss of primary commercial power and availability of standby power. As previously stated, most existing AC units are provided with logic circuits that sense a power failure and switch on the standby power source. The transfer time for such a change-over can be as long as one-half second with existing AC devices. In accordance with this invention, the standby power source is kept constantly attached to and "floating" on the cable input. Accordingly, the transfer time is zero. This is a particularly important advantage in CATV systems which transmit data or alarm signals.

Fifth, utilization of this invention yields a more distortion-free video signal since it will not create noise or hum in the cable circuit.

DESCRIPTION OF THE PREFERRED EMBODIMENT

Figure 1:
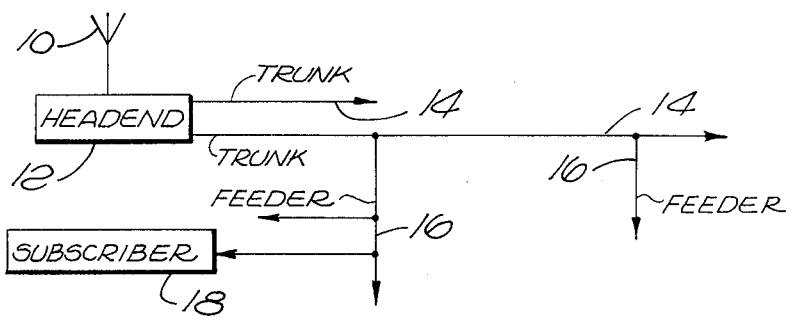
FIG. 1 is a block diagram of a typical CATV network, illustrating the headend, trunk and feeder cables and a single system subscriber.
Figure 2:
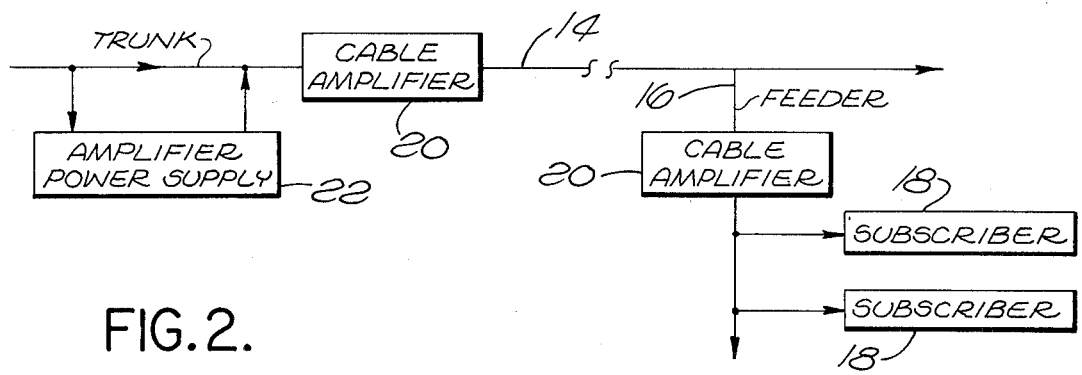
FIG. 2 is a block diagram of a portion of a CATV network, showing distributed cable amplifiers and an amplifier power supply according to this invention.

Referring to FIG. 1, a block diagram of a typical CATV network is shown. An antenna 10 is generally placed at a high elevation for reception of microwave signals or standard TV signals. Received signals are fed to a headend 12 for amplification, filtering and translation of any UHF frequencies to unused VHF channels. The resultant output, carrying all received signals, is applied to a coaxial trunk cable 14 for distribution. Smaller feeder cables 16 branch from the trunk cables 14 and supply subscribers 18 to the system.

As previously described, the coaxial cables substantially attenuate video frequency signals. To enhance the transmitted signals, cable amplifiers 20 are distributed along the trunk and feeder cables 14, 16, as required. To supply power to the amplifiers, an amplifer power supply 22, located at the headend of the system, is directly connected to the coaxial cable. The amplifier power supply 22, shown in detail in FIGS. 3 and 4, constitutes part of the present invention.

Figure 3:
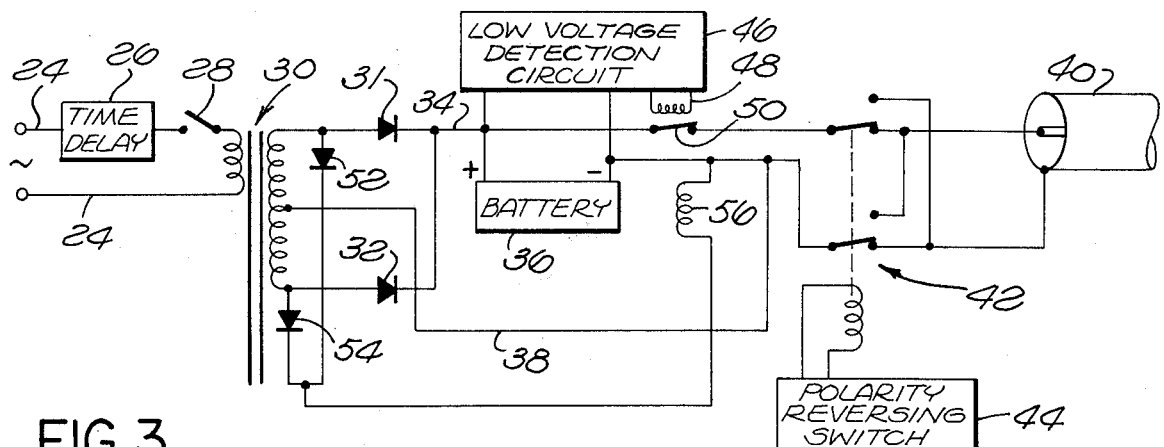
FIG. 3 is a schematic diagram of the DC power supply of this invention, showing the low voltage detection circuit in block form.

Referring to FIG. 3, AC power is received from a commercial source via input lines 24. In order to protect the power supply circuit against line surges when AC power is first applied, a time delay device 26 may be included in the AC supply lines.

Upon closure of a power switch 28, AC power is delivered to the primary windings of a transformer 30. Generally, the transformer is of a ferro-resonant type in order to provide rough regulation.

Diodes 31, 32 serve as standard full-wave rectifiers and create a pulsating DC level on the upper transformer output line 34. The positive line 34 voltage is applied to the positive terminal of a storage battery 36. In the preferred embodiment, the battery 36 is a sealed lead-calcium battery but lead antimony or even CHR batteries may be utilized. Such a lead-calcium battery requires no maintenance for long periods of time.

The battery circuit is completed by connection of the transformer center tap line 38 to the negative terminal of the battery. Accordingly, the storage battery is continually being maintained at maximum charge when the circuit is connected to its primary source of AC power via transformer 36.

The two output lines 34, 38 of the transformer secondary are also connected to the center and sheath conductors of the coaxial cable 40 headend via a polarity reversing switch, if used, shown generally at 42. The purpose of the switch, as its name implies, is to reverse the polarity of the DC voltage applied to the coaxial cable to stop the corrosive action of electrolysis. As is well known, when two different metals at different potentials are in close proximity in the presence of an electrolyte, a corroding plating action takes place. In order to minimize the effect of DC power on this problem, the reversing switch 42 may be operated about once each month. It may, of course, be reversed manually. Or, the switch may be operated automatically at predetermined intervals by a standard timer 44.

It should be noted that the battery 36 is constantly connected to the input of the coaxial cable 40. Accordingly, there is no transfer time experienced in the event of loss of the primary commercial power.

It may sometimes occur that the duration of a power failure is so long that the battery 36 would discharge beyond a safe level. In that event, the battery terminal voltage decreases past a predetermined level. The decrease is sensed by a low voltage detection circuit 46 which energizes a relay coil 48, causing switch 50 to open, thereby ending the battery discharge. In this unlikely event, of course, the coaxial amplifiers receive no further power.

Following a short duration power failure, when commercial power is again available, the battery will begin recharging immediately. Again, there is no interruption of power to the system when the transfer from the standby to the primary source is made.

After a long duration power failure, switch 50 is open and no power is being delivered to the coaxial cable 40. When commercial power is again applied to the system, it will be detected by the diodes 52, 54 connected across the secondary of the transformer. The diodes function to apply continuously a positive voltage to the reset coil 56. Thus, at all times when commercial power is applied to the system, the reset coil 56 is energized, holding the switch 50 in the position illustrated. When commercial power is reapplied, coil 56 serves to close switch 50, connecting the DC power to the cable.

Figure 4:
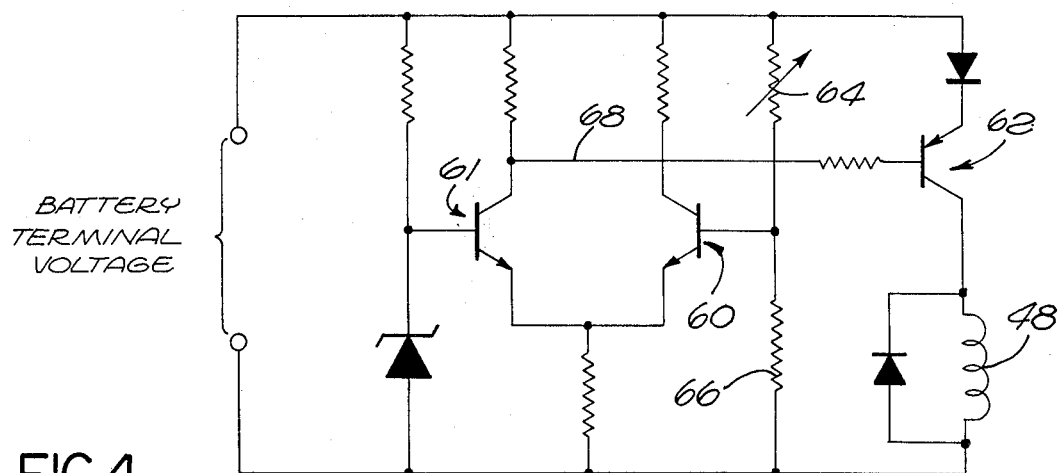
FIG. 4 is a schematic diagram of the low voltage detection circuit shown in block form in FIG. 3.

Referring to FIG. 4, the details of the low voltage detection circuit (46 of FIG. 3) is shown. Under normal conditions, transistor 60 is conducting and transistors 61, 62 are turned off. Under such conditions, of course, no current is flowing through the latch coil 48.

In operation, the circuit illustrated in FIG. 4 constantly senses the voltage appearing across the negative and positive terminals of the battery. Through appropriate adjustment of the voltage divider consisting of resistors 64 and 66 the base of the transistor 60 is maintained at a higher potential than the base of the transistor 61 so long as the voltage of the battery is above a predetermined safe level. For example, the resistor 64 would be adjusted such that so long as the battery voltage was above 25 volts for example in a 30 volt system, the relative potentials between the bases of the two transistors 60, 61 would be such that transistor 60 would be conducting in a saturated state holding transistors 61 and 62 off. Under these circumstances, the battery would be connected to the coaxial cable, thereby providing operating energy for the amplifiers of the system.

In the event the voltage of the battery degrades so as to reach the level of, for example, 25 volts in a 30 volt system, the potential appearing at the base of the transistor 60 would be lower than the potential appearing at the base of transistor 61. As a result of the normal differential amplifier operation, the transistor 60 would become non-conducting and the transistor 61 would become conducting. When this occurs, the voltage appearing on line 68 drops. Thus, the voltage appearing at the base of transistor 62 would be less than the voltage appearing at the emitter, and the transistor would become conducting, thus applying the potential of the battery directly to the coil 48. Energization of the coil 48 would then open switch 50, removing the battery from the circuit to protect it from damage through excessive current drain.

Each cable amplifier would be provided with a diode bridge to allow identical operation with DC voltage of either polarity if required. Also, the input is filtered and regulated to a desired degree at the input to each amplifier.

In the preferred embodiment of this invention, electrolysis problems have been completely overcome by use of aluminum conductors as much as possible. As is well understood, electrolysis is only a problem at the junction of different metals.

I claim:
1. In a direct-current powered community antenna television network system for receiving and distributing video signals to a plurality of receiving subscribers, the combination comprising
    means for receiving broadcast video signals,
    coaxial cable means connected to transmit video signals received by said receiving means,
    means connecting said receiving means to said coaxial cable means for translating all received ultra high frequency video signals to very high frequency video signals,
    a plurality of direct-current powered amplifiers for enhancing video frequency signals, said amplifiers spaced along and connected to said coaxial cable means,
    means for supplying continuous direct current power to operate said amplifiers, comprising
        rectifying means selectively connected to a source of alternating current power for producing a direct current power output,
        rechargeable battery means, and,
        means directly connecting the output of said rectifying means to said battery means and to said coaxial cable means, and,
    a plurality of subscriber video receivers connected to said coaxial cable means for receiving said enhanced video frequency signals.
2. The community antenna television network system of claim 1, further comprising means for selectively reversing the polarity of the direct current output applied to said coaxial cables.
3. The community antenna television network system of claim 1, further comprising
    means connected to the terminals of said storage battery means for sensing the direct current voltage across said terminals and for developing an output if said direct current voltage decreases past a predetermined level, and
    means for breaking the connection between said storage battery means and said coaxial cables in response to the output of said sensing means.
4. The community antenna television network system of claim 1, wherein
    said sensing means comprises means for gating current through a relay coil when said direct current voltage decreases past a predetermined level, and
    said connection breaking means comprises a switch operated by said relay coil.
5. The community antenna television network system of claim 1, wherein said sensing means comprises differential amplifier means for comparing said direct current voltage across said battery terminals with a predetermined direct current voltage level.
6. The community antenna television network system of claim 1, further comprising
    means for selectively reversing the polarity of the direct current output applied to said coaxial cables,
    means connected to the terminals of said storage battery means for sensing the direct current voltage across said terminals and for developing an output if said direct current voltage decreases past a predetermined level, and
    means for breaking the connection between said storage battery means and said coaxial cables in response to the output of said sensing means.

7. The community antenna television network system of claim 6, wherein
said sensing means comprises means for gating current through a relay coil when said direct current voltage decreases past a predetermined level, and
said connection breaking means comprises a switch operated by said relay coil.

8. In a direct-current powered community antenna television network system for distributing video signals via a network of coaxial cables, the combination comprising
a plurality of direct-current powered amplifier means distributed along the cables of said network for enhancing video signals transmitted by said cables, and
means for supplying direct-current power to said cables to operate said amplifier means, comprising
rectifying means connected to a source of alternating-current power for producing a direct-current output,
storage battery means,
means connecting the direct-current output of said rectifying means to the terminals of said storage battery means for maintaining said battery in a fully charged condition,
means connecting the terminals of said storage battery means to said coaxial cables for selectively reversing the direct-current polarity of the voltage applied to said cables,
means connected to the terminals of said storage battery means for sensing the direct-current voltage across said terminals and for developing an output if said direct-current voltage decreases past a predetermined level, and,
means for breaking the connection between said storage battery means and said coaxial cables in response to the output of said sensing means.

9. The combination of claim 8, wherein
said sensing means comprises means for gating current through a relay coil when said direct-current voltage decreases past a predetermined level, and,
said connection breaking means comprises a switch operated by said relay coil.

* * * * *